United States Patent
Russo et al.

(10) Patent No.: US 6,983,450 B2
(45) Date of Patent: Jan. 3, 2006

(54) USER CONFIGURABLE OPERATING SYSTEM

(75) Inventors: Dave Russo, Santa Barbara, CA (US); Bob Frankel, Goleta, CA (US); Karl Wechsler, Santa Barbara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 881 days.

(21) Appl. No.: 09/845,636

(22) Filed: Apr. 30, 2001

(65) Prior Publication Data

US 2001/0025339 A1    Sep. 27, 2001

Related U.S. Application Data

(62) Division of application No. 08/885,520, filed on Jun. 30, 1997, now Pat. No. 6,249,909.

(51) Int. Cl.
   *G06F 9/44*    (2006.01)

(52) U.S. Cl. .................................... 717/124; 714/37

(58) Field of Classification Search ........ 717/124–135; 714/37–38, 45, 47
   See application file for complete search history.

(56) References Cited

U.S. PATENT DOCUMENTS

| | | | |
|---|---|---|---|
| 5,283,900 A | | 2/1994 | Frankel et al. |
| 5,375,228 A | * | 12/1994 | Leary et al. ................. 714/33 |
| 5,602,847 A | | 2/1997 | Pagano et al. |
| 5,739,691 A | | 4/1998 | Hoenninger, III |
| 5,758,144 A | | 5/1998 | Eberhard et al. |
| 5,872,960 A | | 2/1999 | Oz et al. |
| 6,052,748 A | * | 4/2000 | Suominen et al. ............ 710/57 |
| 6,493,868 B1 | * | 12/2002 | DaSilva et al. ............. 717/129 |
| 6,560,722 B1 | * | 5/2003 | Frankel et al. ............... 714/38 |
| 6,775,793 B2 | * | 8/2004 | Deao et al. .................. 714/29 |

OTHER PUBLICATIONS

Lee et al. Power analysis and lower-power scheduling techniques for embedded DSP software. IEEE.*
Luthje et al. A novel approach to code analysis of digital signal processing systems. ACM. 2001. pp. 76-83.*
Potkonjak, Miodrag, et al.; *Algorithm Selection: A Quantitative Computation-Intensive Optimization Approach*, 1994 ACM 0-89791-690-5/94/0011/0090, pp. 90-95.

* cited by examiner

*Primary Examiner*—Wei Y. Zhen
(74) *Attorney, Agent, or Firm*—Robert D. Marshall, Jr.; W. James Brady, III; Frederick J. Telecky, Jr.

(57) ABSTRACT

An operating system preferably for use with a digital signal processing target is disclosed which minimizes time and space requirements on the target DSP chip. The operating system is also configured in accordance with parameters entered by a user regarding the application being developed.

13 Claims, 1 Drawing Sheet

USER CONFIGURABLE OPERATING SYSTEM

This is a division of application Ser. No. 08/885,520, filed Jun. 30, 1997 now U.S. Pat. No. 6,249,909.

TECHNICAL FIELD

This invention relates to computer operating systems and in a preferred embodiment, to operating systems optimized for real-time analysis.

BACKGROUND OF THE INVENTION

Computer operating systems are resident on nearly every computer and are required to run applications software. In certain applications which require a large amount of mathematical processing and specialized digital signal processing (DSP) algorithms, specialized operating systems are available which are optimized to facilitate the implementation of such algorithms. An example of such an operating system is described in U.S. Pat. No. 5,392,448 issued to the assignee of the present invention. Additionally, such an operating system is available commercially under the name Spox.

Real-time applications are software applications. One problem in the development, testing, and debugging of real-time applications is that in order to debug an applications program, the program must be "probed." Specifically, the developer must ascertain the values of numerous variables, timing parameters, and the state of numerous items at various times during operation. Additionally, the developer must be capable of following parameters as they change, etc. It is important that these variables and other items be examined in real-time. Specifically, the data to be examined should be acquired in real-time, while the application is running, with minimal intrusion on the system and without affecting the proper real-time operation of the system.

Specifically, debugging tools which allow the programmer to step through the program instructions one at a time are insufficient. Problems that result from the time relationship between various items, as the program executes, will not be correctly recreated. Often testing the program will itself eliminate or modify the problem, making it difficult or impossible to recreate. For example, statements placed into a program to measure the values of parameters in that program will affect the timing of that program as it executes. If there is a problem which is to be eliminated, and the appropriate measurements are taken in order to debug the program, the taking of the measurements themselves may alter and/or eliminate the problem, making it difficult to recreate. Thus, the developer must be able to monitor and analyze the program as it runs, in real-time. The foregoing is loosely referred to in the computer industry as real-time analysis.

The challenge for developers of applications using real-time operating systems is to be able to measure the program execution with as little intrusion as possible. Intrusion may be in terms of space, in that the techniques for debugging the program may take up memory space, or in terms of time, in that the steps required for debugging the program may actually take up time. Additionally, even outside of the goals of real-time analysis, it is desirable to utilize as little space and time as possible for operation of the operating system on the target DSP.

Real-time analysis tools are available commercially from, for example, a company known as Wind River Systems. Such systems may be employed on a hardware platform comprising a host computer, such as a pentium processor, and a target DSP chip, such as the motorola onex chip. The Wind River analysis tool provides a block of software on a target processor which gathers certain parameters about the digital signal processing applications program, as it runs, and reports such items back to the host computer. The Wind River systems tool also time stamps all events so that the developer can determine if real-time deadlines are being met.

One problem with the Wind River system is that it takes up nearly 60 kilobytes of memory. Additionally, it is not optimized in order to provide for minimum intrusion upon the target DSP in terms of timing. Moreover, the Wind River System requires more than 64 kbytes per second of bandwidth between the host and the target. This means that many host-target interfaces may not be fast enough to handle the data. This creates a problem for applications which require real-time.

It is an object of the present invention to provide a real-time operating system which occupies as little space as possible and also minimizes overhead time required for the operating system to implement its required functionality.

It is an object of the invention to provide real-time analysis with relatively minimal bandwidth (e.g.; 2 kbytes/sec) between the host and the target.

It is a further object of the invention to provide a real-time operating system which minimizes the timing intrusion required when it is attempted to measure parameters and other items in the system for debugging and other purposes.

It is a further object of the invention to provide a host resident configuration tool which, based upon a particular application's parameters, alters the configuration of a target DSP based operating system in order to optimize the efficiency of the operating system.

It is a further object of the invention to execute tasks on the target DSP with minimal intrusion by offloading much of the processing to the host.

SUMMARY OF THE INVENTION

The above and other problems of the prior art are overcome in accordance with the present invention which relates to a real-time operating system which can assist in the performance of real-time analysis and which occupies very little space and time overhead on a target digital signal processor (DSP). The preferred hardware model in which the inventive technique is to be utilized comprises a host CPU and a target DSP. The target DSP is intended to ultimately execute DSP algorithms such as those used in cellular telephones, imaging equipment, etc. During product development, a host CPU is often used in conjunction with the target DSP in order to assist in programming and debugging the software intended to operate on the target.

As a user develops an application, the application is utilized in order to modify the operating system and optimize said operating system for use with a particular application. Specifically, a configuration tool includes a graphical user interface that permits a user to enter various parameters on the host computer which are related to the particular application being developed. Based upon such parameters, the operating system on the target DSP signal processor is configured to minimize the space and time required by the operating system and in order to minimize the intrusion caused by real-time analysis.

In specific embodiments, buffers are aligned in specific places to minimize operating system overhead. Additionally, the system can, based upon specific parameters entered by a user, invoke different techniques within the operating system for keeping track of instructions executed, in order to minimize the overhead associated with such record keeping. In an additional embodiment, periodic functions in the application are examined, and the operating system is configured to run at the maximum period that evenly divides into the period of all periodic functions. Other embodiments are described hereafter.

Additionally, statistics regarding program execution on the target are maintained and sent to the host computer, rather then the time sequence of events being stored on the target and sent to the host. This minimizes storage requirements on the target as well as bandwidth requirements between the host and target.

Some of the efficiency is achieved by utilizing parameters relevant to the application. Other aspects of the efficiency are achieved by executing most of the functionality of the operating system on the host, and using the target DSP to the minimum extent possible.

DETAILED DESCRIPTION OF THE PREFERRED EMBODIMENT

Figure 1:
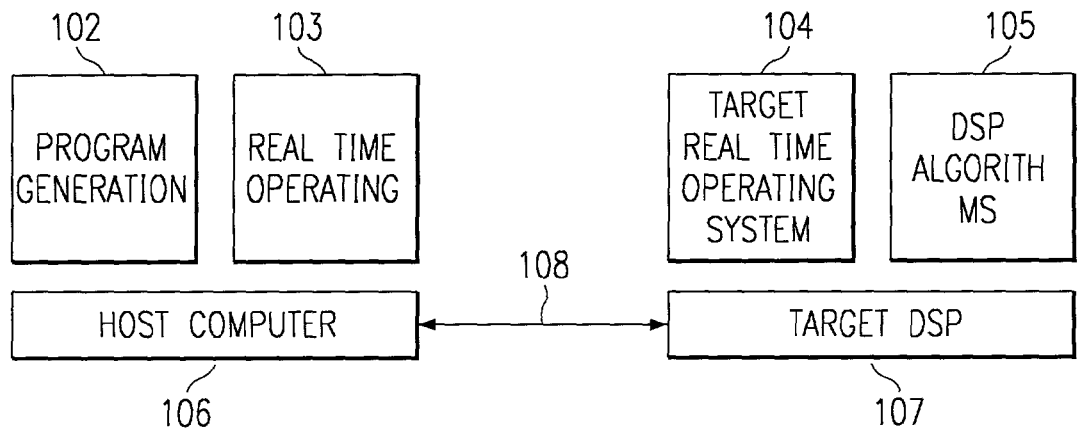
FIG. 1 shows a basic hardware and software architecture in which the techniques of the present invention may be utilized.

FIG. 1 shows an exemplary configuration of hardware and software in which the techniques of the present invention may be utilized. The hardware in FIG. 1 comprises a host computer 106 and a target DSP 107, connected by a communications link 108. In a preferred embodiment, the communications link 108 may be in accordance with the JTAG standard known to those of ordinary skill in this art or may be implemented as any generic real-time connection having at least 2 kbytes per second of bandwidth. The target DSP may be, for example, one of the many TMS320 type of DSPs available from Texas Instruments.

Software on the host computer includes a program generation block, which will be described in further detail later herein, and a set of analysis tools 103. The analysis tools are intended to permit a developer of DSP software which is intended to run on the target DSP 107 to view various parameters, statistics, and system statuses during development and debugging of such target DSP software.

Software resident on the target DSP 107 includes a real-time operating system 104 and a set of DSP algorithms 105 which are well known to those of ordinary skill in this art. The DSP algorithms include such items as fourier transforms, convolutions, etc.

The host computer 106 may include a variety of other items including a program debugger, other applications software, etc. Additionally, the target DSP 107 may include additional items such as device drivers, or other unrelated software as well.

In operation, a program is written on the host computer 106. The program includes several parameters which are read by a software configuration tool included within program generation block 102. The software configuration tool generates files which are to be compiled and liked with the application program itself. The files generated by the configuration tool serve to configure the target DSP to optimize performance, as more fully described below. After compiling and linking of both the applications program and the files generated by the configuration tool, the proper machine code is generated for execution by the target DSP 107. Upon the machine code being generated, the host computer 106 loads the machine code to the target DSP 107 via the communications link 108, and the target DSP then executes the program. The machine code may be loaded independently of communications link 108 if desired.

Based upon the various parameters entered by a user and discussed in more detail below, the target real-time operating system, resident on target DSP 107, is optimized in order to provide that it occupies minimal space and requires minimal time for it to execute its functions. Additionally, when real-time analysis is performed, functions required in order to analyze and debug applications software are performed with minimal intrusion. By allowing the operating system to optimize its configuration, based upon particular items relevant to an application, the intrusion in terms of time and space caused by the operating system is minimal. Additionally, the intrusion caused by the real-time analysis is minimized.

In one particular embodiment, the operating system is optimized to execute various periodic functions entered by a user during program generation. Specifically, the program generation block 102 computes the greatest common divisor of all periodic functions, and configures the target real-time operating system 104 to only run at the minimum frequency required in order to execute all periodic functions. Thus, if there are 3 periodic functions and they are executing at 3, 6, and 12 kilohertz respectfully, then the operating system, when executing periodic functions, will operate at 12 kilohertz. By operating at 12 kilohertz, all periodic functions can be executed on time.

A fixed frequency for the operating system to execute periodic functions would require that the operating system always execute frequently enough to account for the highest frequency periodic function which could ever be entered. In the present invention however, the particular frequencies of execution of periodic functions are examined, and the operating system on the target DSP is configured to specifically optimize it for the frequencies utilized in any particular application.

In another embodiment, it is desirable for the analysis tools 103 to be able to count the number of instruction cycles which have been executed. In furtherance of such object, an interrupt is generated every N instruction cycles. The number of instruction cycles is then measured by incrementing a counter each time an interrupt is generated. When it is desired to ascertain the number of instructions executed, the counter is multiplied by the number of instruction cycles for each interrupt, and then any additional instruction cycles which have not yet added up to enough to cause an interrupt are added.

For example, consider a situation where it is desirable to generate an interrupt every N instruction cycles, where N is some number which may be set by a program developer. When it is desirable to ascertain a number of instruction cycles which has been executed, the user may count the number of interrupts, multiply by N, and then add to that the number of instruction cycles which have executed since the most recent interrupt. Typically, the number of instruction cycles since the last interrupt are kept track of in a first register and the number of interrupts is stored in a second register.

In accordance with the techniques of the present invention, N is chosen to be the highest value represented by a specified number of hexadecimal digits. For example, N may be chosen as FFFF. Each time the counter is incremented, it means that an additional 10,000 instructions have been executed. When it is desirable to ascertain the total number of executed instructions, the concatenation of the first and second registers is the total number of executed instructions, with the least significant bits being the first register and the most significant bits being the second register. Accordingly, a multiplication is eliminated, reducing both time and code space intrusion.

In another particular embodiment designed to minimize the intrusion caused by the operating system, the well known command "printf" from the C language is executed in a different manner than is conventional. Specifically, prior art systems allow a printf command which specifies certain arguments, as well as the type of data these arguments represent. The operating system would typically have to read all these arguments from memory and determine what the arguments represented; e.g.; a binary number, ascii letter, or other value. Next, the arguments must be interpreted and processed correctly in order to extract meaningful information.

In the present invention, the target processor need only store the bit pattern as represented by the arguments. The bit pattern is then offloaded to the host computer 106. The data is then processed by the host to implement the printf command, and the results presented to the developer for later analysis and use. Accordingly, both space and time are saved at the target DSP 107. Specifically, the target does not need to store any instructions regarding how to interpret the data presented as arguments of the printf statement, nor does the target need to actually execute such instructions or even know what the printf command requires. Rather, all the target needs to do is simply read the memory location which is storing the arguments, and save the values for later downloading to host computer 106. The printf format string is not even stored on the target.

In a more general embodiment, any time it is desirable to real-time monitor parameters on the target, all of the processing is done on the host. Specifically, the parameters to be monitored are simply stored at the target, without any interpretation or processing. The parameters may then be transferred to the host for processing and interpretation, thereby minimizing the timing and storage intrusion on the target DSP.

Another parameter of interest in real-time operating systems is the time between when a particular task is ready to execute and the time when the task completes. Such timing is critical in real-time systems because the processor is actually multiplexing its time between numerous tasks to be performed. If the task is ready to be performed but must wait too long for other tasks to be complete, the real-time deadline may be missed. Additionally, if a task starts being serviced by the processor shortly after being in a ready state, but gets interrupted too many times or for too long during operation, the real-time deadlines will be missed as well. Accordingly, the developer needs to be aware of how much time it is taking between specific tasks being ready to execute and those tasks being completed by the processor. This time frame is termed the "waiting time" herein.

Typically, the prior art has approached this issue by simply time stamping various events within the target, and downloading all of those events to the host computer for a later analysis. However, such a technique requires a relatively large amount of storage in the target, as well as the processing overhead of time stamping each event. Additionally, a large bandwidth is required to transmit the timing data between the host and the target DSP. In the present invention, statistics regarding task execution and real-time scheduling are collected and transmitted at intervals to a host.

In a preferred embodiment, the target DSP collects only three parameters: (i) a counter which signifies the number of times each task executed, (ii) a sum that indicates the total amount of time between a task being ready and a task being complete, and (iii) a third counter that keeps track of the maximum time between the ready state and the completion state for each task. By collecting only these three parameters in real-time, the host can calculate the average waiting time, as well as the maximum time. Thus, the host is provided with real-time analysis information, just as if the target were actually doing real-time analysis.

Additionally, in a more general embodiment, the three parameters described above need not be directly associated with waiting times. Specifically the system may be programmed to accumulate, for any given value or parameter (i.e.; an object) (i) the number of such object occurrences, (ii) the sum of all such objects, and (iii) the maximum value of such object. Utilizing such a technique, statistics regarding various items can be maintained such as: (i) target load and maximum busy period (ii) worst and average case interrupt latency (iii) worst and average case interrupt jitter, (iv) number of times each thread is executed and (v) amount of data flowing through each data stream. The host then uses the statistics to ensure that the foregoing parameters are within specified bounds. Items iv and v are straight forward to those of ordinary skill in this art. Items i-iii involve some manipulation, as set forth below.

Figure 2:
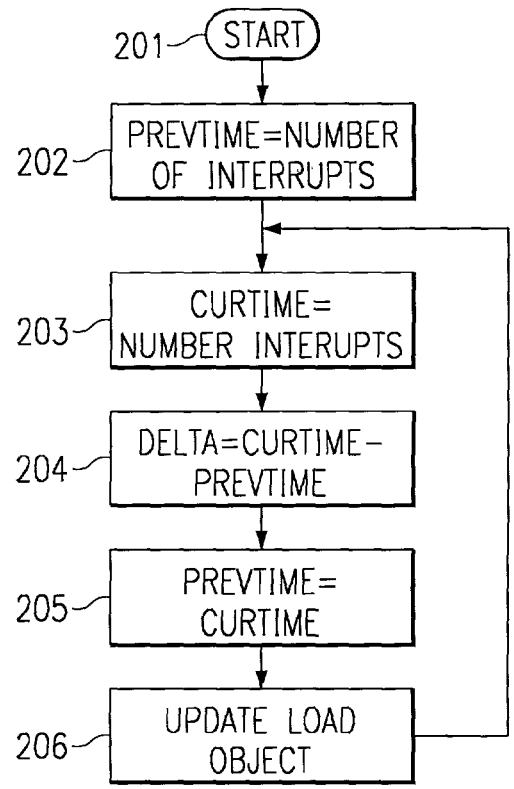
FIG. 2 shows a flow chart of an algorithm for measuring statistics regarding CPU load.

Regarding item (i), the target load and maximum busy period is computed by executing a particular loop of software when no other task needs to be executed in the system. The particular loop executing is shown in FIG. 2. After the flow chart is entered at 201, the variable PrevTime, representing a previous time, is set equal to an arbitrary number of timer interrupts. As the loop is entered at block 203, the variable CurTime, equal to the current time, is set equal to the number of timer interrupts. Next, at block 204 the variable delta is set equal to CurTime minus PrevTime. PrevTime is set equal to CurTime at block 206 and the load object is then updated.

Each statistical object, including the load object, includes three values: a sum, a maximum, and a number of occurrences. For the load object, the foregoing three values are represented as load.sum, load.max and load.count. The target updates the load object each pass through the loop of FIG. 2 by adding the present value of delta to load.sum, incrementing load.count by one and replacing load.max with the present value of delta if and only if the present value of delta is greater than the value presently stored in load.max.

It can be appreciated that the variable load.sum is keeping track of the total elapsed time between successive reads of the data by the host. Further, it can be appreciated that a maximum busy period can be derived from the variable load.max.

Specifically, the target load can be calculated as 1-(K*load.count)/(load.sum*P) and the maximum busy period can be calculated as load.max*P, where K is the number of instruction cycles required to complete one pass through the loop of FIG. 2 and P is the number of instruction cycles between successive timer interrupts.

Since the variables K and P do not change during the operation of an applications program, the host configuration tool can determine the proper values of K and P for storage in the host working memory so that the host can compute target load and maximum busy period.

Regarding interrupt latency, it is once again possible to measure worst case and average interrupt latency by creating an object which contains a sum, maximum, and number of times executed. Specifically, a hardware timer register continually counts down between X and 0, and generates an interrupt. When the interrupt is generated, the register is then read. The value RegVal is equal to the negative of the value read from the register. The variables latency.sum, latency.max represent the sum and maximum of the RegVal values, and the value latency.count represents the number of times the register is read.

The time difference between the interrupt and the time the register was read represents interrupt latency. The maximum interrupt latency is defined as X+latency.max. The average case interrupt latency is defined as (latency.sum+X*latency.count)/latency.count. The calculations can be done on the host, and the target need only keep track of the three aforementioned items.

Finally, interrupt jitter, the variability in time between successive executions of the specified interrupt service routine, can be calculated. Specifically, at the beginning of an interrupt service routine, the value in a count down register is first negated. Next, the variable delta is assigned the value of the current time minus the previous time. The previous time is then set equal to the current time and the jitter object is updated before the interrupt is serviced. The longest period between interrupts is then X+jitter.max and the average period between interrupts is (jitter.sum+X*jitter.count)/jitter.count. By calculating the maximum time between interrupts as well as the average time between interrupts, a measure of the interrupt jitter is obtained.

In summary then, by maintaining the number of occurrences, sum, and maximum of a variety of different items, various real-time statistical data can be calculated and maintained by the host. This results in the real-time analysis placing minimal additional processing and memory requirements on the target, and minimal host/target bandwidth requirements.

In an additional enhancement, a buffer for storing event logs is aligned properly so that the target DSP can compute the next location in the buffer with a minimum of processing overhead. If the buffer length is an even power of 2, and the buffer start address is a multiple of the buffer length, then the next address in the event log buffer can be computed as follows:

next address=buffer start address+((current address+1) & (buffer length−1)).

The foregoing formula will automatically wrap around to the beginning of a circular buffer. Since the buffer length is invariant, it can be computed on the host. Thus, the intrusion on the target is limited to an "and" function and the storage of the constant buffer begin address.

It is also noted that the branching of the software usually required to calculate an address is eliminated. Specifically, without the use of the automatic wrap around descried above, two different algorithms would be required to calculate the next address. A first algorithm would be required if the next address is before the end of the queue, and a second algorithm would be required if the "next" address is past the end of the queue. The branching of the software required in such a system, which branching is expensive in terms of processing power, is eliminated by the automatic wrap around.

The foregoing techniques have one item in common. All the techniques divide the tasks required for real-time analysis into a host portion and a target portion. The target portion then performs only the minimum required tasks in order to preserve data in which a developer is interested. All other tasks involved in real-time analysis are off-loaded to the host. In some cases, the computation is required only once, and thus, the computation may be performed by the host as the application's parameters are entered.

By utilizing the foregoing variety of optimization techniques, the intrusion on the target DSP is minimized. The above describes the preferred embodiments of the invention. Various other additions and modifications will be apparent to those of ordinary skill in the art.

What is claimed is:

1. A method of performing real-time analysis of a target digital signal processor chip, said target DSP chip operating in conjunction with a host computer, the method comprising:
    storing, on the host computer, instructions for interpreting and processing statistics to be monitored;
    operating the target DSP chip according to an application program;
    accumulating, in at least one counter at the target DSP, a count of occurrences of at least one object corresponding to the statistics during the operating step;
    transferring the contents of the at least one counter to the host; and
    processing and interpreting the statistics at the host responsive to the contents of the at least one counter.

2. The method of claim 1, wherein the statistics correspond to wait times for real-time tasks in the application program; and further comprising:
    utilizing said statistics at the host to ascertain whether said system is properly performing in real-time.

3. The method of claim 1, further comprising:
    ascertaining, at said host computer, parameters of the application program;
    in response to the ascertained parameters, defining operating parameters for said target DSP to minimize time and space intrusion from real-time analysis of said target DSP; and
    configuring an operating system of the target DSP responsive to the defined operating parameters.

4. The method of claim 1 wherein said statistics include a count, a maximum, and a sum.

5. A method of performing real-time analysis in a computer system, said computer system comprising a host and a target digital signal processor, said method comprising:
    inputting, via a graphical user interface, information regarding an application program;
    configuring an operating system of said target DSP responsive to the information;
    operating the target DSP to execute the application program;
    accumulating, at the target DSP, at least one count of occurrences of an object during the operating step;
    communicating the at least one count of occurrences to the host; and
    operating the host to analyze the operation of said target DSP responsive to the communicated at least one count.

6. The method of claim 5, wherein the accumulating step comprises:
    maintaining at the target DSP a count, a sum and a maximum value corresponding to the object;
    and wherein the communicating step communicates said count, sum and maximum value to the host.

7. The method of claim 6 wherein said step of operating the target DSP comprises:

counting down a counter from an initial value vast an interrupt value;

responsive to the counter reaching the interrupt value, issuing an interrupt;

responsive to the interrupt, adding the contents of the counter to the contents of a sum register;

responsive to the interrupt, incrementing an interrupt counter; and responsive to the interrupt, and responsive to the contents of the counter exceeding the contents of a maximum register, replacing the contents of the maximum register with the contents of the counter;

wherein the communicating step comprises communicating the contents of the sum register, the interrupt counter, and the maximum register to the host, so that the host can analyze interrupt latency.

8. The method of claim 6 wherein said step of operating the target DSP comprises:

initializing a previous time value in a first register;

advancing a first counter from the previous time value in response to an event;

then determining a difference between the contents of the first counter and the contents of the first register;

storing the difference in a delta register;

incrementing a second counter;

responsive to the difference exceeding the contents of a maximum register, replacing the contents of the maximum register with the difference;

storing the contents of the first counter in the first register; and repeating the advancing, determining, storing, incrementing, replacing, and storing steps;

wherein the communicating step comprises communicating the contents of the delta register, the second counter, and the maximum register, to the host, so that the host can analyze CPU load.

9. The method of claim 7 wherein said step of operating the target DSP comprises:

responsive to servicing the interrupt, negating the contents of the counter;

determining a jitter time corresponding to the initial value plus the negated contents;

adding the jitter time to the contents of a jitter sum register;

responsive to the jitter time exceeding the contents of a maximum jitter time register, replacing the content of the maximum jitter time register with the jitter time; and incrementing a jitter counter; and wherein the communicating step comprises communicating the contents of the jitter sum register, the jitter counter, and the maximum jitter time register to the host, so that the host can analyze interrupt jitter.

10. The method of claim 6 wherein said object corresponding to number of times a thread is executed.

11. The method of claim 6 wherein said object corresponding to wait time.

12. The method of claim 6 wherein said object corresponding to amount of data through a data stream.

13. The method of claim 6 wherein said step of operating the target DSP comprises:

initializing a previous time value in a first register;

advancing a first counter from the previous time value in response to an event;

then determining a difference between the contents of the first counter and the contents of the first register;

storing the difference in a delta register;

responsive to the difference exceeding the contents of a maximum register, replacing the contents of the maximum register with the difference;

storing the contents of the first counter in the first register; and repeating the advancing, determining, storing, replacing, and storing steps;

wherein the communicating step comprises communicating the contents of the maximum register to the host, so that the host can analyze maximum CPU busy period.

* * * * *